April 6, 1937.  R. R. LEWIS ET AL  2,076,376
IMPRESSION BLANKET
Original Filed Feb. 24, 1934
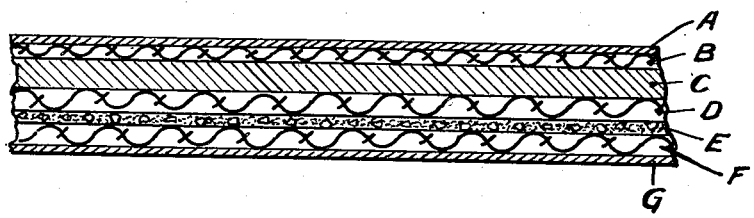
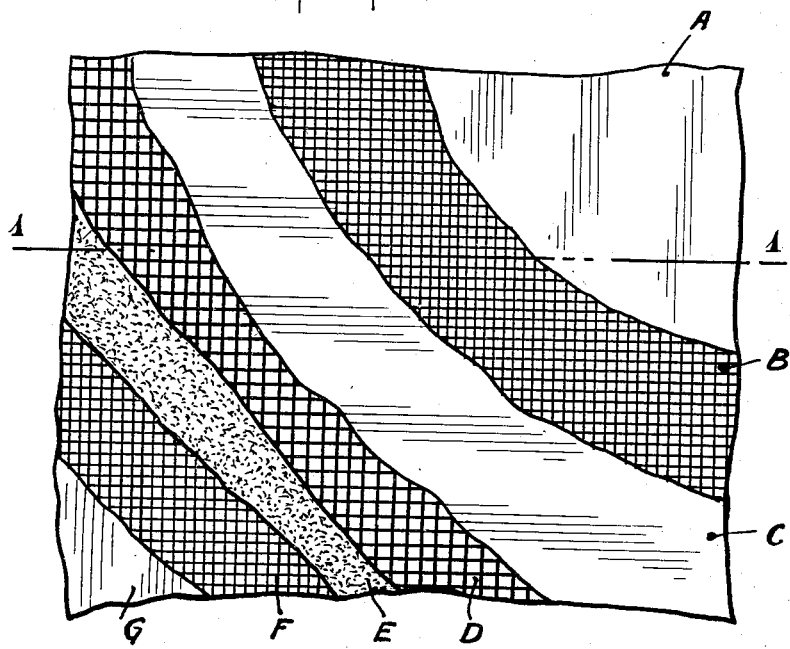
INVENTORS
Robert R. Lewis
Albert J. Weiss
BY
Mock & Blum
ATTORNEYS Patented Apr. 6, 1937

2,076,376

UNITED STATES PATENT OFFICE 2,076,376

IMPRESSION BLANKET

Robert R. Lewis, Baldwin, and Albert J. Weiss, Mineola, N. Y., assignors to Vulcan Proofing Company, New York, N. Y., a corporation of New York Application February 24, 1934, Serial No. 712,702
Renewed January 6, 1937

4 Claims. (Cl. 154—54.5)

This invention relates to a new and improved impression blanket or make-ready element, for rotary printing presses.

One of the objects of the invention is to produce a superior blanket for use on the presses used in printing newspapers, and for other typographic rotary presses.

Another object of the invention is to produce an impression blanket, which can be manufactured at greatly reduced cost.

According to the invention the blanket is made up of a plurality of plies of cotton fabric which are thoroughly impregnated and bonded by means of a tough elastic material. Said blanket is coated on both surfaces with a flexible and tough material which is resistant to inks and solvents.

Other objects of the invention will be set forth in the following description and diagrammatic drawing, which illustrates a cross-section of the improved blanket, it being understood that the above general statement is intended merely to explain the same and not to limit it in any manner.

Fig. 1 is a sectional view.

Fig. 2 is an elevation, portions of the top layers being removed.

According to the invention, we prefer to use three plies of fabric, although this number can be varied.

The blanket comprises fabric layers B, D and F. The face fabric layer B can be made of a comparatively thin and light-weight fabric which is preferably made of cotton. Said surface layer B may be made of aeroplane cloth, sail cloth, or one of the fabrics used in making balloons. This fabric may have a tensile strength of at least eighty pounds per inch of width in both directions as determined by the standard grab method.

Said fabric B may have at least eighty warp threads per inch and at least eighty filler threads per inch, and its thickness should exceed not more than .009 inch (nine thousandths of an inch).

The intermediate or center fabric ply D can be a cotton fabric which is made with a sateen weave and having approximately the following characteristics: tensile strength of warp 150 pounds per inch, tensile strength of filler 130 pounds per inch.

Said intermediate ply D has approximately 107 warp threads per inch, 66 filler threads per inch and its thickness is about .023 inch (23 thousandths of an inch). The weight of said intermediate fabric ply D, is about ten ounces per square yard.

For certain types of blankets, the same fabric may be used for making the intermediate fabric ply D and the bottom fabric ply F. If a thinner blanket is desired the thickness of the bottom fabric ply F can be reduced.

The details relative to the above mentioned fabric are given to indicate the general type of fabric which we prefer to use and such details may be varied considerably without departing from the invention. However, the face fabric B must be thin, and said face fabric must be more stretchable than the base fabrics D and F, in order to permit the blanket to be bent from the planar form, to the cylindrical form, around an impression cylinder. Likewise, the face fabric B must be sufficiently strong to withstand the tension, when the blanket is bent around the cylinder, and said face fabric B must be sufficiently strong to withstand the impact of the type or other printing means, without breaking. Since the surface coating A is thin, as later disclosed herein, the impact of the type is in effect taken up by the face fabric B.

The blanket also comprises a top coating A, a bottom coating G, a resilient intermediate layer C, a layer E of resilient cement, and a back surface coating G. If it is desired to make a blanket having a total thickness of .094 inch (94 thousandths of an inch), the thickness of the respective components may be as follows:—

| | Inch thickness |
|---|---|
| A—Surface coating | .006 |
| B—Top fabric ply | .009 |
| C—Resilient intermediate layer | .015 |
| D—Center fabric ply | .024 |
| E—Resilient combining cement | .012 |
| F—Bottom fabric ply | .024 |
| G—Back coating | .004 |

If the thickness of the blanket is to be approximately .064 inch (64 thousandths of an inch), said thickness may be approximately distributed as follows:—

| | Inch |
|---|---|
| A—Surface coating | .006 |
| B—Top fabric ply | .005 |
| C—Resilient layer | .012 |
| D—Center fabric | .024 |
| E—Resilient layer | .003 |
| F—Bottom fabric | .010 |
| G—Back coating | .004 |

In the last mentioned example, the top fabric ply B can be a light balloon cloth such as HH cloth. The intermediate fabric ply D can be cotton sateen, and the bottom layer F can be made of airplane cloth.

Other fabric combinations can be used since the essential point is to provide a rather firm impression face which is formed by the top coating A, reinforced by the fabric ply B, and having a resilient layer or body underneath said impression face.

The layers C and E may be formed of the same resilient material if desired and said layers C and E may be applied by means of calendering or by spreading with a solution of said resilient material. We prefer to spread a liquid solution in order to insure uniform thickness.

The layers C and E can be made of any suitable rubber compound, or other material having similar properties.

The fabric plies B, D and F are thoroughly impregnated with the elastic bonding material which is used for making the layers C and E. After the fabric layers have been saturated and united by means of the elastic bonding material, the outer coatings A and G can be formed by any desirable method, such as spreading a solution of the coating material, or by calendering said coating material.

We prefer to make said surface coatings from a mixture which contains a material of the type of ethylene polysulphide, as described in U. S. Patent No. 1,846,810. However said layers could be made from nitro-cellulose, cellulose acetate, linseed oil varnish bakelite and other resins, etc.

When we use a surface coating of ethylene polysulphide material, said surface coating is applied by means of calendering. In applying other coating materials, we prefer to spread solutions of said coating materials.

If a rubber compound or compounds are used for saturating and combining the fabric plies, it is necessary to vulcanize said elastic bonding compound. For this purpose we can use the method which is set forth in U. S. Patent No. 1,846,810, by wrapping the blanket in a coated liner on a hollow metal drum, and heating by means of steam. This method can also be used for setting or vulcanizing the ethylene polysulphide material.

The make-ready for the cylinder of the press may have a plurality of make-ready elements, and a blanket made according to our invention, can be used as the top blanket of the make-ready.

It will be noted that the top fabric ply B is preferably thinner than the other fabric plies.

Likewise, if the fabric plies which are below the top fabric ply differ in thickness, the center fabric ply is preferably thicker than the bottom fabric ply. Since the top fabric ply B is preferably impregnated with rubber or the like, prior to the application of the surface coating A, said surface coating A has either no surface penetration into the previously impregnated ply B, or said penetration is very slight. In effect the layers A and B form a combined reinforced surface for the blanket and the layer C, which is of substantial thickness, provides the necessary resilience.

The relatively thick fabric ply D provides the necessary support and it is reinforced by means of the second fabric ply F, since both fabric plies are bonded to each other. The back coating G prevents any oil or other injurious substance from seeping into the improved blanket through the rear surface thereof.

In assembling the elements of the improved blanket, the warp threads of the respective fabric layers B, D, and F, are preferably parallel to each other. However, said warp threads of the respective layers need not necessarily be parallel to each other and the warp threads of the ply D can be perpendicular to the warp threads of the ply B, and any other intermediate relations can be utilized.

The improved construction makes the blanket very flexible and easily bendable because the fabric reinforcement is divided into at least two layers which have an intermediate layer of elastic material, which has a certain yield when the improved blanket is bent so as to conform to the shape of the cylinder of the rotary press.

The improved construction makes it unnecessary to utilize a draw-sheet.

We claim:

1. A blanket for the cylinder of a rotary printing press, said blanket comprising a face layer of fabric and at least two additional body layers of fabric, the face layer of fabric having a surface coating of ink-resistant material, the face layer of fabric being connected to the adjacent body layer of fabric by an intermediate layer of resilient material, the body layers being also connected to each other by an intermediate layer of resilient material, the face layer of fabric being thinner than the adjacent layer of resilient material and the succeeding fabric body layers, said face layer of fabric being sufficiently stretchable and strong to enable the blanket to be stretched under tension around the impression cylinder and to withstand the impact of the printing means, without breakage of said face layer.

2. A blanket for the cylinder of a rotary printing press, said blanket comprising a face layer of fabric and at least two additional body layers of fabric, the face layer of fabric having a surface coating of ink-resistant material, the face layer of fabric being connected to the adjacent body layer of fabric by an intermediate layer of resilient material, the body layers being also connected to each other by an intermediate layer of resilient material, the face layer of fabric being thinner than the adjacent layer of resilient material and the succeeding fabric body layers, said face layer of fabric being sufficiently stretchable and strong to enable the blanket to be stretched under tension around the impression cylinder and to withstand the impact of the printing means, without breakage of said face layer, the surface coating of ink-resistant material being thinner than the face layer of fabric.

3. A blanket for the cylinder of a rotary printing press, said blanket comprising a face layer of fabric and at least two additional body layers of fabric, the face layer of fabric having a surface coating of ink-resistant material, the face layer of fabric being connected to the adjacent body layer of fabric by an intermediate layer of resilient material, the body layers being also connected to each other by an intermediate layer of resilient material, the face layer of fabric being thinner than the adjacent layer of resilient material and the succeeding fabric body layers, said face layer of fabric being sufficiently stretchable and strong to enable the blanket to be stretched under tension around the impression cylinder and to withstand the impact of the printing means, without breakage of said face layer, the layer of resilient material which is directly adjacent the face layer of fabric being thinner than the succeeding body layer of fabric.

4. A blanket for the cylinder of a rotary printing press, said blanket comprising a face layer of fabric and an additional body layer of fabric, the face layer of fabric having a surface coating of ink-resistant material, the face layer of fabric being connected to the adjacent body layer of fabric by an intermediate layer of resilient material, the face layer of fabric being thinner than the adjacent body layer and also being thinner than the layer of resilient material which is between said face layer and said body layer, the face layer of fabric being sufficiently stretchable and strong to enable the blanket to be stretched under tension around the impression cylinder and to withstand the impact of the printing means without breakage of said face layer.

ROBERT R. LEWIS.
ALBERT J. WEISS.